United States Patent
Henly et al.

(10) Patent No.: US 6,611,735 B1
(45) Date of Patent: Aug. 26, 2003

(54) METHOD OF PREDICTING AND OPTIMIZING PRODUCTION

(75) Inventors: Timothy J. Henly, Maidens, VA (US); Thomas Patrick Stocky, Glen Allen, VA (US)

(73) Assignee: Ethyl Corporation, Richmond, VA (US)

(*) Notice: Subject to any disclaimer, the term of this patent is extended or adjusted under 35 U.S.C. 154(b) by 0 days.

(21) Appl. No.: 09/441,964

(22) Filed: Nov. 17, 1999

(51) Int. Cl.⁷ .............................................. G05B 21/00
(52) U.S. Cl. ........................... 700/266; 700/31; 700/44; 700/272; 702/27; 702/30
(58) Field of Search ........................ 700/266, 31, 272; 259/340; 327/300; 219/494; 702/27, 30; 44/324; 208/138

(56) References Cited

U.S. PATENT DOCUMENTS

| | | | |
|---|---|---|---|
| 4,358,822 A | * 11/1982 | Sanchez | 700/31 |
| 4,549,883 A | * 10/1985 | Purcell et al. | 44/324 |
| 4,623,968 A | * 11/1986 | Niese | 700/266 |
| 5,353,207 A | 10/1994 | Keeler et al. | |
| 5,386,373 A | 1/1995 | Keeler et al. | |
| 5,430,295 A | * 7/1995 | Le Fabre et al. | 259/340 |
| 5,446,681 A | * 8/1995 | Gethner et al. | 702/27 |
| 5,452,232 A | * 9/1995 | Espinosa et al. | 702/30 |
| 5,479,573 A | 12/1995 | Keeler et al. | |
| 5,490,085 A | * 2/1996 | Lambert et al. | 700/266 |
| 5,539,638 A | 7/1996 | Keeler et al. | |
| 5,548,528 A | 8/1996 | Keeler et al. | |
| 5,559,690 A | 9/1996 | Keeler et al. | |
| 5,613,041 A | 3/1997 | Keeler et al. | |
| 5,682,317 A | 10/1997 | Keeler et al. | |
| 5,729,661 A | 3/1998 | Keeler et al. | |
| 5,768,475 A | 6/1998 | Godbole et al. | |
| 5,781,432 A | 7/1998 | Keeler et al. | |
| 5,796,251 A | * 8/1998 | Le Fabre et al. | 324/300 |
| 5,819,006 A | 10/1998 | Keeler et al. | |
| 5,825,646 A | 10/1998 | Keeler et al. | |
| 5,842,189 A | 11/1998 | Keeler et al. | |
| 5,859,773 A | 1/1999 | Keeler et al. | |
| 5,933,345 A | 8/1999 | Martin et al. | |
| 5,950,182 A | 9/1999 | Godpole et al. | |
| 6,002,839 A | 12/1999 | Keeler et al. | |
| 6,047,221 A | 4/2000 | Piche et al. | |
| 6,159,255 A | 12/2000 | Perkins | |
| 6,169,980 B1 | 1/2001 | Keeler et al. | |
| 6,210,563 B1 | * 4/2001 | Tsao et al. | 208/138 |
| 6,294,764 B1 | * 9/2001 | Lindner et al. | 219/494 |
| 6,317,654 B1 | * 11/2001 | Gleeson et al. | 700/272 |

OTHER PUBLICATIONS

W.B. Maxwell, J.V. Hanlon, E.J. Forster, & R.M. Ponder; How to accurately predict cetane numbers of diesel–fuel blend stocks; Oil & Gas Journal; Nov. 3, 1969.

* cited by examiner

*Primary Examiner*—Jill Warden
*Assistant Examiner*—Brian Sines
(74) *Attorney, Agent, or Firm*—Dennis H. Rainear

(57) ABSTRACT

A process for the prediction and the optimization of the output of a plant producing products form incoming materials. The incoming materials are classified according to various physical characteristics and costs. The desired or ordered products are also classified according to price and physical requirements. The incoming materials information and the product information is entered into a database which is accessible by a computing device. The computing device then calculates the optimal production process by calculating a plurality of production cycles and selecting the cycle with the optimum profitability. The computing device is programmed with non-linear equations derived from a regressive analysis of data collected from samples of incoming materials and products.

24 Claims, 1 Drawing Sheet

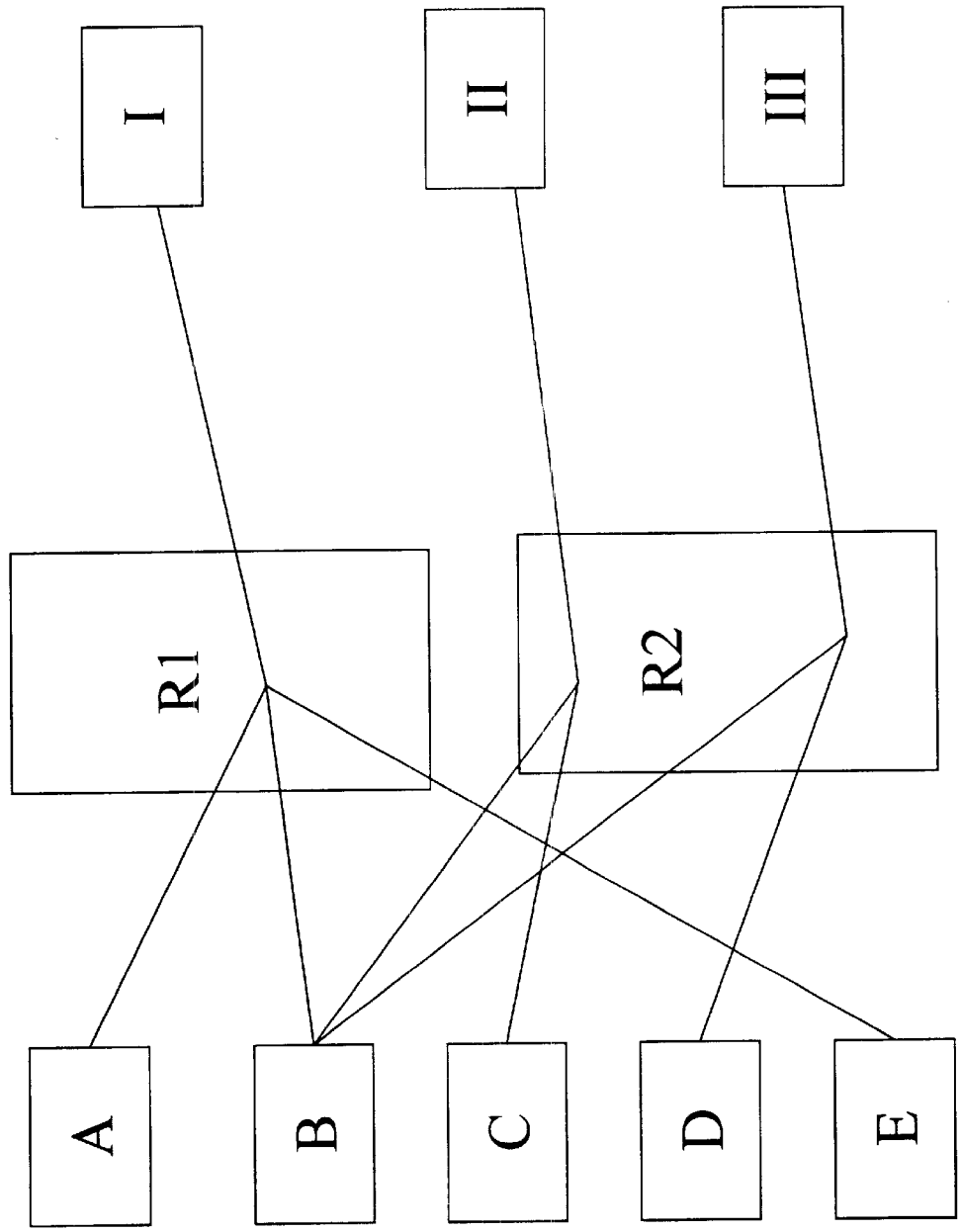

METHOD OF PREDICTING AND OPTIMIZING PRODUCTION

BACKGROUND OF THE INVENTION

1. Field of the Invention

The present invention relates generally to a process and method for the prediction of the properties of and the optimization of a plant's output of products from a source or sources of raw material.

More specifically, the present invention relates to a process and method for increasing the predictability and profitability of operations where a series of raw materials are combined and processed into intermediate or final products by optimizing the cost structure of the raw materials, and the output of final or intermediate products to result in the lowest cost materials input and highest value production output.

The present invention also relates to the optimization of refining processes and petroleum blending operation to result in the highest value production output from available fuel stocks.

The present invention also relates to the accurate prediction of final properties of a blended fuel utilizing non-linear optimization and property prediction.

2. Description of the Prior Art

Fuel Additive Industry

It is well known in the petroleum and other industries to maximize profitability by blending fuel stocks with appropriate additives to increase their commercial value. Ethyl Corporation, of Richmond Va. supplies many fuel additives, including a diesel cetane improver known commercially as DII-3™ which is used to raise the cetane level of a diesel fuel stock and thereby make otherwise lower-valued fuel stocks into valuable commercial fuels. MMT (manganese methylcyclopentadienyl manganese tricarbonyl) is a fuel additive, also manufactured by Ethyl Corporation, of Richmond Va., that provides octane enhancement while reducing the amount of crude oil necessary to produce gasoline. Ethyl Corporation additionally manufactures the HiTEC® 4700 Series of antioxidants, including hindered phenolics and diphenylamines to JP8+100 jet fuel additive which have known effects on the fuel.

Performance fuels for varied applications and engine requirements are known for controlling combustion chamber and intake valve deposits, cleaning port fuel injectors and carburetors, protecting against wear and oxidation, improving lubricity and emissions performance, and ensuring storage stability and cold weather flow.

Fuel detergents, dispersants, corrosion inhibitors, stabilizers, oxidation preventers, and performance additives are known to increase desirable properties of fuels.

It is known that mixtures of fuels and additives can increase and decrease desired properties in a resultant fuel blend.

SUMMARY OF THE INVENTION

The present invention contemplates supplying to an end user a tool for the prediction of and the consequent optimization of production from a plant which creates products from available raw materials.

The tool includes an update-able database of incoming raw material properties, preferably including physical properties as well as economic properties, e.g. the cost of those raw materials. The tool also includes a database of blend-stock properties, product specifications, processes, and the market price for the final and/or end product. A user can input the available raw material stocks, including their costs and available volumes, and input the standing production orders, including price and minimum acceptable values, and the computing device will determine the accurate properties of the outcoming product and the optimum value to be extracted for a production run based on the available data.

In one embodiment, including by way of example diesel fuel stocks with cetane improver or pour point improvers, a method is disclosed utilizing linear and non linear equations to more accurately predict the cetane number, pour point, and/or other properties of the resulting fuel product.

In another embodiment, the present invention discloses a method of accurately predicting a characteristic of a product to be prepared by a processing plant, by providing an incoming material having at least one measured property, selecting at least one product having a desired characteristic to be prepared from said incoming material by said processing plant, selecting a process to be used by the processing plant to produce the product with its characteristic, and calculating a predicted value of the characteristic of the product utilizing a predictive equation. The predictive equation is a validated non-linear equation generated by regressive analysis of an accumulation of data relating the measured property of the incoming material, the process, and the characteristic of the product.

As used hereinbelow, "reactor" should be construed in its broadest sense, to include mixing vessels, distillation columns, thermal cracking devices, etc. which may admix, treat, react or otherwise affect a material therein.

BRIEF DESCRIPTION OF THE DRAWINGS

FIG. 1 is a step block diagram of an exemplary production process.

DETAILED DESCRIPTION

Petroleum Generally

Crude oil, as a natural product, is very different in chemical composition depending upon the point of origin. Petroleum occurs throughout the world, and commercial fields have been located on every continent, crude oil from each region having very different properties. Petroleum is an extremely complex mixture and consists primarily of hydrocarbons as well as compounds containing nitrogen, oxygen, and sulfur. Most petroleums also contain minor amount of nickel and vanadium. Petroleums have a variety of different components with boiling ranges from about 20° C. to above 650° C.

For an excellent discussion of the many and varied properties of crude oils, one may turn to, e.g. *Marks' Standard Handbook for Mechanical Engineers, Tenth Edition,* T. Baumeister, McGraw Hill, 1996 (ISBN 0-07-004997-1), "Petroleum and Other Liquid Fuels", J. G. Speight, pp. 7-10 through 7-14, which are incorporated herein by reference.

The chemical and physical properties of petroleum vary considerably because of the variations in composition. Crude oils are rarely used as fuel because the properties do not meet the specifications required by either furnaces, boilers, or engines. Crude oils, being complex mixtures of various complex chemicals, are not predictably mixed as the properties do not blend linearly.

Refining Processes

Petroleum raw materials, e.g. crude oil from any of various sources in nature, are distilled into various fractions having differing commercial value.

Distillation separates the crude oil into fractions equivalent in boiling range to gasoline, kerosene, diesel fuel, lubricating oil, and residual. Thermal or catalytic cracking is used to convert kerosene, gas oil, or residual to gasoline, lower boiling fractions, and residual coke. Catalytic reforming, isomerization, alkylation, polymerization, hydrogenation, and combinations of these and other catalytic processes are used to upgrade the various refinery intermediates into improved gasoline stocks or distillates. The major finished products are usually blends of a number of stocks, plus additives.

Typical end products include gasoline, jet fuel, diesel fuel, residual products, specialty products, and petroleum coke.

Gasoline is a complex mixture of hydrocarbons that distills within the range of 100 to 400° F. Commercial gasolines are blends of straight-run, cracked, reformed, and natural gasolines.

The specifications for gasoline (ASTM D439 and D4814, which are incorporated herein by reference) provide for various volatility classes, varying from low-volatility gasolines to minimize vapor lock to high-volatility gasoline that permits easier starting during cold weather.

Aviation gasoline has a narrower boiling range than motor gasoline. It has fewer low boiling and high boiling components. Aviation gasoline is defined by ASTM D910.

Kerosene is less volatile than gasoline and has a higher flash point, to provide greater safety in handling. Other quality tests are specific gravity, color, odor, distillation range, sulfur content, and burning quality. Specific tests for quality include flash point (minimum 115° F.), distillation endpoint (maximum 572° F.) sulfur (maximum 0.13 percent) and color (minimum +16) according to ASTM D187.

Jet or Aviation turbine fuels are not limited by antiknock requirements and have wider boiling point ranges to assure greater availability for general aviation. Their properties are specified by ASTM D1655. Military requirements are as set forth in Military Specifications Mil-T-5624 (JP-4 and JP-5), Mil-T-83133 (JP-8), and Mil-P-87107 (JP-10).

Diesel fuel is a liquid product distilled over the range of 350° C. to 650° F. The carbon number ranges from about C10 to C18. The chemical composition of a typical diesel fuel and how it applies to the individual specifications—API gravity, distillation range, pour point, and flash point—are directly attributable to both the carbon number and the compound classes present in the finished fuel.

Diesel fuels are measured in several aspects according to ASTM standards. They include API gravity (ASTM D1298), total sulfur (ASTM D2622), boiling point (ASTM D86), flash point (ASTM D93), pour point (ASTM D97), hydrogen content (ASTM D3701), cetane number (ASTM D613), acid number (ASTM D974), water and sediment content (ASTM D1796), kinematic viscosity (ASTM D445), carbon residue on 10% residuum (ASTM D524), Ash (wt %) max (ASTM D482) and distillation temp (ASTM D86).

The various diesel fuels for motor use require variability in performance since the engines range in size from small, high speed engines used in trucks and buses, to large, low-speed stationary engines for power plants. Thus, ASTM D975 provides for the specifications of a variety of diesel fuels.

The combustion characteristics of diesel fuels are expressed in terms of the cetane number, a measure of ignition delay. A short delay (the time between injection and ignition) is desirable for a smooth running engine. Some diesel fuels contain cetane improvers, which usually are alkyl nitrates. The cetane number is determined by engine test (ASTM D613) or an approximate value, termed the cetane index, can be calculated for fuels which do not contain a cetane improver.

The value of each of these components fluctuates on a daily basis, depending on supply and demand, market factors such as political disturbance in oil-producing regions, and weather, among others. A lively futures market exists for various grades of crude oil and refined products. Keeping track of the cost of raw materials and prices of intermediate or finished products on a day-to-day basis is a daunting task.

Processing crude oil is an extraordinarily complicated matter. The oil refinery separates the crude oil into individual compounds, or, more often, distillation fractions that consist of compounds with similar properties.

Business Models and Solutions

Operating a refinery or fuel blending and distillation plant is extraordinarily complex. Operating one in the most profitable manner possible is likewise exponentially more difficult. Several treatises are available to help in the understanding of the petroleum industry and refining, such as *Petroleum Refinery Process Economics,* R. E. Maples, 1993, PennWell Publishing Company, Tulsa Okla. (ISBN 0-87814-384-X) and *Petroleum Refining for the Nontechnical Person,* W. L. Leffler, 1979, 1985, PennWell Publishing Company, Tulsa Okla. (ISBN 0-87814-280-0), each of which is incorporated by reference.

Multiple software programs are available to assist in the economic running of a refinery. They include several commercially available from Aspen Tech, Cambridge, Mass. 02141-2200. Aspen PIMST™ is a PC-based linear programming software module used by the petroleum and petrochemical industries. The software is capable of handling detailed operations planning, economic evaluation and scheduling activities based upon the cost and availability of raw materials, capacity considerations, and the demand for output.

Aspen PIMS™ are a series of software tools for economic planning in the process industries. The system is designed to run on a Pentium™ class processor, or higher. Operating system platforms include Windows 95™, and Windows NT™.

Aspen PIMS™ employs a linear programming (LP) technique utilizing a CPLEX™ optimizer, available from ILOG CPLEX Division, Incline Village, Nev. 89451, to optimize the operation and design of refineries, petrochemical and chemical plants or other facilities. It is stated to be useful for such varies processes as evaluation of alternative feedstocks and product slates, optimization of operating decisions and product blending, and sizing of plant units in grass-roots and expansion studies.

Aspen PIMS™ Scheduling Software assists in the preparation of detailed operating plans for material receipts, process operations, product blending and product shipments.

SDPIMS™, also available from Aspen Tech, is software which models complex multiple-source, multiple-product, multiple-mode, multiple-tiered pricing, multiple-destination supply and distribution sytems and develops an optimized, least-cost solution for the entire network. Among other items, the time value of money is taken into account, as are time period lags for product shipments, and minimum, maximum, and target inventories.

Aspen PIMS™ Refinery Scheduling System is software which is said to schedule refinery and petrochemical plant operations from feedstock arrivals to blendstock production, while Aspen PIMS™ Product Scheduling System is designed to schedule product blending and shipping activities. Aspen PIMS™ Pipeline Scheduling System is designed to schedule product deliveries through a pipeline network from product source through pumpstations and depots to final delivery point.

In terms of the underlying crude oil related products and their properties, PassMan™ also available from Aspen, is a PIMS™ crude oil assay manager whose function is to serve as a manager of a crude oil library and to output a table of crude oil data that is recut to the needs of the end user either for input into their linear production model or other applications. Other assay databases are available.

Optimization

Sunset Software Technology, based in San Marino, Calif. 91108, supplies multiple optimization algorithm based products. Sunset's products include linear, binary, mixed-integer, interior point (barrier) and quadratic programming products and services, which operate on platforms ranging from PC's to UNIX workstations. They include products currently marketed under the following names: XA Linear Optimizer System™, XA Binary and Mixed Integer Solver™, XA Barrier Solver™, XA Quadratic Solver™, XA Parallel MIP Solver™, and XA Callable Library™.

CPLEX™ Base Development system, available from ILOG, includes several commercial optimizers—primal Simplex, dual Simplex, and network Simplex solvers for linear programming problems. This program is in one embodiment configured with the CPLEX Callable Library™, which provides CPLEX algorithms in a library of CPLEX algorithmic and utility routines. The CPLEX Mixed Integer Solver Option™ includes the capability to solve problems with mixed integer variables (general or binary), utilizing algorithms and techniques, including cuts (cliques & covers), heuristics, and a variety of branching and node selection strategies. CPLEX Barrier/QP Solver™ is a primal-dual log barrier algorithm with predictor corrector said to be useful for solving certain classes of linear programming models and quadratic programming problems.

AIMMS™ (Advanced Integrated Multidimensional Modeling Software), available from Paragon Decision Technology B.V., P.O. Box 3277, 2001 DG Haarlem, The Netherlands, is a software package which allows modelers to create functional analytic decision support applications. AIMMS contains a graphical model explorer, which builds and maintains complex (optimization-based) modeling applications. AIMMS is said to be capable of modeling a particular (optimization-based) decision support problem, creating an end-user interface around the model suitable for use by end users.

AMPL™ modeling language, available from CPLEX (a division of ILOG) is an algebraic modeling language for linear, nonlinear, and integer programming problems. It is said to be useful for optimization model types including linear programming problems, network problems, mixed integer programming problems, quadratic programming problems, and general non-linear programming problems.

The General Algebraic Modeling System (GAMS™), available from GAMS Development Corporation, 1217 Potomac Street NW, Washington, D.C. 20007 USA is software capable of modeling linear, nonlinear and mixed integer optimization problems. GAMS can solve LP, MIP and different forms of NLP models.

MPL™ (Mathematical Programming Language), available from Maximal Software, Inc., 2111 Wilson Boulevard, Suite 700, Arlington, Va. 22201, U.S.A. is a modeling system that permits the construction of complex models, involving thousands of constraints which allows the import of data directly from a database and then export of the solution back into the database.

Models developed in MPL can be used with nearly all LP-solvers on the market today as MPL supports a number of industrial strength solvers.

The mathematical technique known as linear programming is commonly used by many of the above programs to solve a variety of industrial and scientific problems by arriving at an "optimal solution". Linear programming ("LP") has existed from about the 1940's. It works by creating an LP "model" which represents some situation that is then solved to discover the optimum plan.

A valid LP model must have four elements. First, there must be an objective function. Generally for business models the value to maximize is profit, and the value to be minimized is usually cost or distance. Each activity in the model contributes to this objective, either favorably or unfavorably. Second, there are limited resources. For example, a machine can only run for 24 hours in a day, or only so much material is available to purchase. Third, there must be linear relationships between activities and these resources. For example, one relationship might be the number of machine hours which should be operated and how much material should be bought. Finally, there must be an assumption of certainty, i.e. an assumption that these conditions in the model will be resolved feasibly. A more sophisticated technique known as stochastic programming exists to handle probability-based programming.

A variety of industrial LP applications have been developed to solve varying requirements. For example, in the field of product planning, one can plan an appropriate mix by solving the LP for optimal production quantities of products subject to resource capacity and market demand constraints. For blends, one can solve for optimal proportions of ingredients for products such as gasoline, foods, livestock feeds, subject to certain minimal requirements.

For distribution, one can use LP to solve for optimal shipping assignments from factories to distribution centers or from warehouses to retailers. For location planning, e.g. of facilities, one can determine the optimal location of a plant or warehouse with respect to total transportation costs between various alternative locations and existing supply and demand sources.

For process control, one can use LP models to, e.g. solve for the cutting pattern that minimizes the amount of scrap material, given the dimensions of a roll or sheet of raw material. For scheduling, one can use LP to determine the minimum-cost assignment of workers to shifts subject to varying demand. For vehicles, one can assign available vehicles to jobs and determine the number of trips to make, subject to vehicle size, availability, and demand constraints. Similarly, for routing, one can solve for the optimal routing of a product through a number of sequential processes, each with its own capacities and characteristics.

For production planning, one can solve for minimum-cost production scheduling for a given work force, taking into account inventory carrying and subcontracting costs. The management of production and work force may be accomplished by LP by solving for minimum-cost production scheduling, taking into account hiring and layoff costs as well as inventory carrying, overtime, and subcontracting costs, subject to various capacity and policy constraints. Furthermore, one can solve for optimal staffing for various categories of workers, subject to various demand and policy constraints.

More sophisticated techniques involve the modification of standard LP techniques, but which relax some of the assumptions of the basic LP model.

Integer, binary, and mixed integer program modeling allow for activities that may only be conducted incrementally. With shipping for example, if one truckload is shipped, costs of the truck must be calculated whether one pallet or 24 pallets are shipped.

Non-linear programming allows for non-linear relationships between activities and constraints, while stochastic programming allows for uncertainty.

A presently preferred optimizer program for the instant invention is What'sBest!™ 4.0, available from Lindo Systems, Inc., 1415 North Dayton Street, Chicago, Ill. 60622, USA, which is an add-in to Excel™ (available from Microsoft, Inc. Redwood, Wash.) that allows the building of large scale optimization models in a free form layout within a spreadsheet. What'sBest!™ combines the linear, nonlinear and integer optimization with Microsoft™ Excel™.

Optimization in the Petroleum Industry

As noted above, there are many uses for various petroleum products, and each end use, e.g of diesel fuel has varying requirements for the product for safe, environmentally conscious, and economical use.

However, the fuel stocks on hand may frequently be limited to nonoptimal fuel stocks. For example, the refiner may need to determine whether it is more economical to blend a distillate component, such as Light Cycle Oil, into diesel or into residual product. Each of the fuels has a different value, and each of the raw materials (diesel fuel stocks, residual stocks, cetane improvers, etc) has a different value as a blending component.

The traditional approach has included mixing stocks in a blending operation to attempt to solve supply issues, but the accurate prediction of non-linear properties combined with a maximization of profit potential has been limited by the linear nature of the optimization software. There has been until now no validated way to accurately predict the properties of complex systems, e.g. blended fuels, additive enhanced fuels, and the like. In production, refiners are frequently forced to remeasure the data and compare it to a predicted value, making production decisions based upon these predicted properties delayed and/or flawed.

In one embodiment of the present invention, a complex production process can be more effectively managed from a business standpoint by assessing the relative values of incoming materials or components of the final product, and accurately predicting the properties of the final products.

Turning to FIG. 1, a hypothetical production scenario is represented by the step block diagram. Various raw material sources, each having different properties, are labeled A, B, C, D and E. Production reactors R1 and R2 are available for the mixing or other processing of the raw materials. Desired end or final products are I, II and III.

Raw materials A–E may be virtually any raw material—crude oils for distillation, gasoline stocks for blending, additives and fuels for specialty fuel production, sands (e.g. silica) for raw glass or ceramic production, paint pigments and solvents for paint systems, particulates for alloy manufacture by tape casting, die casting, sintering, annealing, grains for cereal or bread production, nutraceuticals for vitamin manufacture, etc. The raw materials may be combinable by mixing, reacting, or otherwise commingling; or may be separatable by fractionation, distilling, cracking, or the like.

Each applicable industry to which this invention may be applied will have its own known methods of mixing, producing, refining, etc., which result in known products. The following examples, while most exemplary of the invention in the petroleum blending and additive industry, should not be construed as limiting, as the invention has far-ranging uses which one skilled in the art, having regard for this disclosure, will easily be able to achieve.

Fuels are blended differently for seasons and uses, as illustrated above. There are several different categories of blendstocks available for fuel use—aviation, kerosene, gasoline, diesel, and residual are the most common.

The blending of fuels is not represented by a linear relationship. Given the complex nature of the various petrochemicals present in fuelstocks, simply mixing a fuel component of a known cetane number, for example, with another of known cetane number does not necessarily result in an intermediate cetane number fuel. It is possible for a blended fuel to have a lower cetane number than either of the component diesel fuels, resulting in a loss in value (negative blending). Thus, it is vital to the economic survival of the refiner or manufacturer to have an accurate prediction of the properties and values of the resulting product.

By way of nonlimiting example, one possible manufacturing operation is the creation of a diesel fuel, by blending fuel streams and/or by the inclusion of a cetane improver. The standard method to measure the cetane number is the use of a cetane engine as described in ASTM D613. It is possible presently to predict cetane number with the cetane index equations indicated in ASTM D976 and ASTM D4737. However, such cetane index prediction models generally have an error of at least 2 cetane numbers. This is a costly error which can result in "cetane giveaway". Not only is cetane index a poor predictor, it does not take into account the improvement in cetane number caused by additives.

Thus, if a pipeline has a requirement of a cetane number of 40, the cetane index must be at least 42 to assure the minimal requirements of the pipeline are being met. Table I, below indicates the cetane standards for the Colonial Pipeline Company, of Atlanta, Ga.

TABLE I

Colonial Pipeline Company
Specifications for Fungible Low Sulfur Diesel Fuel (cetane only)
Issue No. 3; Grade 74

| PRODUCT PROPERTY | ASTM Test Method | Test Results Min | Max | Notes |
|---|---|---|---|---|
| Notes | | | | |
| Cetane Number | D613 | | 40 | |
| Cetane Index | D976 | | 42 | 4 |

NOTES
4 Where cetane number by test method D613 is not available, test method D976 or D4737 can be used as an approximation. Minimum cetane index of 42 accounts for +/− 2 accuracy of the cetane index methods in approximating cetane number.

As may be seen from the above, one supplying fuel to the Colonial Pipeline using the standard Cetane Index calculation must supply fuel of a minimum of 42 cetane index, in effect giving away the commercial value of 38, and potentially 42 cetane number diesel fuel. Cetane Number must be determined using a Cetane Engine after the blend has been formulated and prepared, which is often too late to be of substantial economic advantage during preparation and blending.

However, with the novel invention, sufficient data is collected on a wide range of properties relating to a plurality of fuel components such that an extremely accurate prediction of the cetane number may be made.

Accurate prediction of the properties of the resultant product is important to assist in optimizing the output of a plant which produces such products; for example, the operator of such a plant may make more of a higher priced product than a lower priced product and thereby maximize profit, so long as the operator is assured that the final product will meet specifications. By means of this invention, additional components or reblending after formulation is not needed.

Ladommatos and Goacher in "Equations for predicting the cetane number of diesel fuels from their physical properties", *Fuel*, Vol. 74 No. 7, pp. 1083–1093 (1995) derived twenty-two equations for predicting the cetane number of diesel fuels. Likewise, Maxwell et all in "How to accurately predict cetane numbers of diesel-fuel blend stocks", *Oil and Gas Journal*, Nov. 3, 1969 developed predictive equations for cetane value. These articles are incorporated by reference as if fully set forth herein.

Each of these articles, however, fails to provide a reliable prediction of the variety of properties required by a complex system of physical parameters. They rely primarily upon the cetane index, which alone is notoriously inaccurate.

An exemplary prediction of the cetane number of diesel fuel containing additives will be discussed as follows.

Turning now to Table II, several diesel fuel properties are indicated which are important for meeting the various ASTM or military specifications for such fuels (see, e.g. ASTM D975).

TABLE II

| DIESEL FUEL PHYSICAL PROPERTIES |
| --- |
| Hydrocarbon Type |
| Carbon content |
| Hydrogen content |
| Sulfur content |
| Nitrogen content |
| API (specific) gravity |
| Distillation range |
| Cetane number |
| Aniline point |
| Heat content |
| Kinematic viscosity |
| Cloud point |
| Pour point |
| Flash point |

Data were collected on 154 low sulfur diesel fuels to derive cetane-prediction equations for diesel fuels with and without the addition of a cetane improver. The equations were derived by the use of statistical analysis including multiple linear regression to derive equations to predict the cetane number of fuels not in the original data set. Equations containing different combinations of variables were developed to accommodate laboratories with different analytical capabilities. The invention thus provides prediction models using from 4 to 8 or more input variables.

The equations were then validated with twenty new fuels not in the original data set of 154 fuels.

The equations derived are a set of non-linear calculations as follows:

Definitions

CN=cetane number (ASTM D613)

CN 0, 1000, 2500, 5000, 7500, 10000 cetane number with ppmv of cetane improver DII-3™

T90=temperature at which 90% of the material boiled off (°C.)

T50=temperature at which 50% of the material boiled off (°C.)

T10=temperature at which 10% of the material boiled off (°C.)

ANPT=aniline point (°C.)

VISC40=viscosity at 40° C. (ASTM D445)

D976=cetane index as provided by ASTM D976

CLOUD=temperature at which wax crystallization occurs (°C.)

SPGR=specific gravity (no dimension)

FIAAROM=aromatic content (vol. %) measured by ASTM D1319

The exemplary preferred models for diesel fuel cetane number prediction upon inclusion of a cetane improver follow:

MODEL 1 (Wherein There are 5 Inputs)

CN 0=T90×(−0.073074)+ANPT×0.307979+VISC40×(−1.152177)+ D976×0.49566+CLOUD×0.183557+31.572661

CN 1000=T90×(−0.093739)+ANPT×0.273761+VISC40×(−0.951212)+D976×0.588985+CLOUD×0.206887+40.162203

CN 2500=T90×(−0.096809)+ANPT×0.252126+VISC40×(−0.988991)+D976×0.670028+CLOUD×0.194338+42.384571

CN 5000=T90×(−0.090088)+ANPT×0.308413+VISC40×(−1.183015)+D976×0.646113+CLOUD×0.16953+41.297981

CN 7500=T90×(−0.076015)+ANPT×0.362383+VISC40×(−1.306567)+D976×0.649497+CLOUD×0.137109+35.771915

CN 10000=T90×(−0.069705)+ANPT×0.418994+VISC40×(−1.257463)+D976×0.603263+CLOUD×0.108566+33.746498

MODEL 2 (5 Inputs)

CN0=T50×0.170022+T90×(−0.090224)+SPGR×(−238.35652)+ FIIAROM×(−0.119872)+CLOUD×0.218696+237.776061

CN1000=T50×0.180185+T90×(−0.106238)+SPGR×(−256.07975)+ FIIAROM×(−0.112265)+CLOUD×0.241931+259.828051

CN2500=T50×0.186051+T90×(−0.107282)+SPGR×(−264.7448)+ FIIAROM×(−0.121278)+CLOUD×0.230962+269.911717

CN5000=T50×0.192809+T90×(−0.103698)+SPGR×(−267.85828)+ FIIAROM×(−0.148856)+CLOUD×0.211281+273.437865

CN7500=T50×0.207947+T90×(−0.092333)+SPGR×(−283.78141)+ FIIAROM×(−0.169967)+CLOUD×0.18288+282.147518

CN10000=T50×0.216317+T90×(−0.086368)+SPGR×(−285.49607)+FIIAROM×(−0.193056)+CLOUD×0.157395+ 281.674744

MODEL 3 (5 Inputs)

CN0=T10×0.052862+T50×0.132853+T90×(−0.073079)+SPGR×(−319.241664)+CLOUD×0.198433+295.090575

CN1000=T10×0.055293+T50×0.139078+T90×(−0.087318)+ SPGR×(−332.515775)+CLOUD×0.221971+313.561752

CN2500=T10×0.065233+T50×0.135657+T90×(−6.084119)+ SPGR×(−347.966881)+CLOUD×0.208466+328.012419

CN5000=T10×0.091782+T50×0.118204+T90×(−0.06947)+SPGR× (−371.389545)+CLOUD×0.18161+344.864624

CN7500=T10×0.120328+T50×0.105859+T90×(−0.045566)+ SPGR×(−403.830741)+CLOUD×0.146444+363.855067

CN10000=T10×0.137699+T50×0.099245+T90×(−0.03274)+ SPGR×(−421.974629)+CLOUD×0.115835+374.491796

MODEL 4 (3 Inputs)

CN0=ANPT×0.281122+VISC40×(−1.030139)+D976×0.65189

CN1000=ANPT×0.240331+VISC40×(−0.909077)+D976×0.794587

CN2500=ANPT×0.217108+VISC40×(−1.074988)+D976×0.914676

CN5000=ANPT×0.263156+VISC40×(−1.335108)+D976×0.936531

CN7500=ANPT×0.304818+VISC40×(−1.322044)+D976×0.934638

CN10000=ANPT×0.3534+VISC40×(−1.25902)+D976×0.905473

MODEL 5 (7 Inputs)

CN0=T10×−0.565869+T50×T90×0.000458+(T90)$^2$×(−0.000992)+T10/SPGR ×0.526071+T90/SPGR×0.426314−64.399604

CN1000=T10×−0.443266+T50×T90×0.000483+(T90)$^2$×(−0.001215)+T10/SPGR×0.425422+T90/SPGR×0.536406−81.532783

CN2500=T10×−0.473346+T50×T90×0.000468+(T90)$^2$×(−0.001226)+T10/SPGR×0.458768+T90/SPGR×0.542029−79.539029

CN5000=T10×−0.582345+T50×T90×0.000399+(T90)$^2$×(−0.00113)+T10/SPGR×0.573578+T90/SPGR×0.50863−73.521591

CN7500=T10×−0.624713+T50×T90×0.000359+(T90)$^2$×(−0.001125)+T10/SPGR×0.632041+T90/SPGR×0.524471−79.914841

CN10000=T10×−0.722336+T50×T90×0.000346+(T90)$^2$×(−0.001046)+T10/SPGR×0.727228+T90/SPGR×0.487577−74.343479

Cetane numbers at intermediate concentrations of cetane improver are calculated by interpolating the values from these formulae. The formulae may be reduced to lower numbers of significant figures, e.g. 2, 3, or 4 with minimal loss of accuracy of prediction.

This method allows the calculation of cetane numbers of the product from the properties of the components, and does not rely on the cetanes. As discussed infra, many of the ingredients in a complex chemical system react in a non-linear fashion and result in unexpected properties. Accumulation of data and the subsequent inclusion of corrections in a nonlinear model enables the inventive method to provide a far more accurate prediction of the properties of the resultant composition or system.

The formulas which follow, containing fewer significant digits, also provide the benefits of the instant invention Model 1

CN0=−0.07307×T10+0.3080×ANPT−1.152×VISC40+0.4957×D976+0.1836×CLOUD+31.57

CN1000=−0.09374×T10+0.2738×ANPT−0.9512×VISC40+0.5890×D976+0.2069×CLOUD+40.16

CN2500=−0.09681×T10+0.2521×ANPT−0.9890×VISC40+0.6700×D976+0.1943×CLOUD+42.38

CN5000=−0.09009×T10+0.3084×ANPT−1.183×VISC40+0.6461×D976+0.1695×CLOUD+41.30

CN7500=−0.07602×T10+0.3624×ANPT−1.307×VISC40+0.6495×D976+0.1371×CLOUD+35.77

CN10000=−0.06971×T10+0.4190×ANPT−1.257×VISC40+0.6033×D976+0.1086×CLOUD+33.75

A generic formula is also provided which is suitable for the practice of the instant invention:

CN(X)=T10×(−0.06971 to −0.09681)+ANPT×(0.2521 to 0.4190)+VISC40×(−0.9512 to −1.307)+D976×(0.4957 to 0.6700)+CLOUD×(0.1086 to 0.2069)+(31.57 to 42.38), where (X) equals ppmv of cetane improver.

Model 2

CN0=0.1700×T50−0.09022×T90−238.4×SPGR−0.1199×FIAAROM+0.2187×CLOUD+237.8

CN1000=0.1802×T50−0.1062×T90−256.1×SPGR−0.1123×FIAAROM+0.2419×CLOUD+259.8

CN2500=0.1861×T50−0.1073×T90−264.7×SPGR−0.1213×FIAAROM+0.2310×CLOUD+269.9

CN5000=0.1928×T50−0.1037×T90−267.9×SPGR−0.1489×FIAAROM+0.2113×CLOUD+273.4

CN7500=0.2079×T50−0.09233×T90−283.8×SPGR−0.1700×FIAAROM+0.1829×CLOUD+282.1

CN10000=0.2163×T50−0.08637×T90−285.5×SPGR−0.1931×FIAAROM+0.1574×CLOUD+281.7

A generic formula is also provided which is suitable for the practice of the instant invention:

CN(X)=T50×(0.1700 to 0.2163)+T90×(−0.08637 to −0.1073)+SPGR×(−238.4 to −285.5)+FIAAROM×(−0.1123 to −0.1931)+CLOUD×(0.1574 to 0.2419)+(237.8 to 282.1), where (X) equals ppmv of cetane improver.

Model 3

CN0=0.05286×T10+0.1329×T50−0.07308×T90−319.2×SPGR+0.1984×CLOUD+295.1

CN1000=0.05529×T10+0.1391×T50−0.08732×T90−332.5×SPGR+0.2220×CLOUD+313.6

CN2500=0.06523×T10+0.1357×T50−0.08412×T90−348.0×SPGR+0.2085×CLOUD+328.0

CN5000=0.09178×T10+0.1182×T50−0.06947×T90−371.4×SPGR+0.1817×CLOUD+344.9

CN7500=0.1203×T10+0.1059×T50−0.04557×T90−403.8×SPGR+0.1464×CLOUD+363.9

CN1000=0.1377×T10+0.09925×T50−0.03274×T90−422.0×SPGR+0.1158×CLOUD+374.5

A generic formula is also provided which is suitable for the practice of the instant invention:

CN(X)=T10×(0.05286 to 0.1377)+T50×(0.09925 to 0.1391)+T90(−0.03274 to −0.08732)+SPGR×(−319.2 to −422.0)+CLOUD×(0.1158 to 0.2220)+(295.1 to 374.5), where (X) equals ppmv of cetane improver.

Model 4

CN0=0.2811×ANPT−1.030×VISC40+0.6519×D976

CN1000=0.2403×ANPT−0.9091×VISC40+0.7946×D976

CN2500=0.2171×ANPT−1.075×VISC40+0.9147×D976

CN5000=0.2632×ANPT−1.335×VISC40+0.9365×D976

CN7500=0.3048×ANPT−1.322×VISC40+0.9346×D976

CN10000=0.3534×ANPT−1.259×VISC40+0.9055×D976

A generic formula is also provided which is suitable for the practice of the instant invention:

$$CN(X)=ANPT \times (0.2171 \text{ to } 0.3534)+VISC40 \times (-0.9091 \text{ to } -1.335)+D976 \times (0.6519 \text{ to } 0.9365),$$

where (X) equals ppmv of cetane improver.
Model 5

$$CN0=-0.5659 \times T10+0.000458 \times T50 \times T90-0.000992 \times (T90)^2+0.5261 \times T10/SPGR+0.4263 \times T90/SPGR-64.40$$

$$CN1000=0.4433 \times T10+0.000483 \times T50 \times T90-0.001215 \times (T90)^2+0.4254 \times T10/SPGR+0.5364 \times T90/SPGR-81.53$$

$$CN2500=-0.4733 \times T10+0.000468 \times T50 \times T90-0.001226 \times (T90)^2+0.4588 \times T10/SPGR+0.5420 \times T90/SPGR-79.54$$

$$CN5000=-0.5823 \times T10+0.000399 \times T50 \times T90-0.001130 \times (T90)^2+0.5736 \times T10/SPGR+0.5086 \times T90/SPGR-73.52$$

$$CN7500=-0.6247 \times T10+0.000359 \times T50 \times T90-0.001125 \times (T90)^2+0.6320 \times T10/SPGR+0.5245 \times T90/SPGR-79.91$$

$$CN10000=-0.7223 \times T10+0.000346 \times T50 \times T90-0.001046 \times (T90)^2+0.7272 \times T10/SPGR+0.4876 \times T90/SPGR-74.34$$

A generic formula is also provided which is suitable for the practice of the instant invention:

$$CN(X)=T10 \times (-0.4433 \text{ to } -0.7223)+T50 \times T90 \times (0.000346 \text{ to } 0.000483)+(T90)^2 \times (-0.000992 \text{ to } -0.001226)+T10/SPGR \times (0.4254 \text{ to } 0.7272)+T90/SPGR \times (0.4263 \text{ to } 0.5420)+(-64.40 \text{ to } -81.53),$$

where (X) equals ppmv of cetane improver.

Turning now to Table III below, a comparison of the values of the cetane number of 20 fuels, calculated-by the prior art methods (D-976, D-4737, and CGSB (Canadian General Standards Bureau method) versus the instant models is illustrated.

actual samples, and resulting blended products. The properties are then entered into a database or spreadsheet and correlated to cetane number by linear regression analysis. In another preferred embodiment, there are at least 4 (four) properties measured for each component used in the final blend. Five, six, seven, or more properties are also acceptable, and there may be as many as required to formulate a statistically proper prediction equation.

Preferably, the prediction calculation is tied into a spreadsheet, such as Excel™, even more preferably along with additional calculations such as cost. Initially, the product to be produced, and its characteristics are selected. Such characteristics include typically such qualities as minimum and maximum volumes, price of the end product, minimum and maximum API, maximum sulfur content, minimum flash point, maximum aromatics content, maximum freeze point, T90, cloud point, pour point, viscosity at 100 degrees C. (ASTM D445), viscosity at 40 degrees C., vanadium content, and cetane number.

Then, the appropriate feedstock to create the desired product is provided to the model. Characteristics of the feedstock to be selected for fuel production include amount available, purchase price, API, sulfur content, aromatics,. naphthalene content, smoke, vanadium content, aniline point, cloud point, flash point, freeze point, pour point, viscosity at 100° C., viscosity at 40° C., distillation T10, distillation T50, distillation T90, and cetane number.

Then, the product requirements and raw materials data are inputted into the database either manually or by importation from another database in a known manner. Table IV illustrates an exemplary entry table for cetane requirements for a finished product.

TABLE III

| Fuel | CN | D-976 | D-4737 | CGSB | Model 1 | Model 2 | Model 3 | Model 4 | Model 5 |
|------|------|-------|--------|------|---------|---------|---------|---------|---------|
| A | 48.5 | 49.8 | 51.6 | 50.1 | 48.1 | 46.9 | 48.4 | 48.3 | 48.7 |
| B | 47.8 | 48.2 | 48.0 | 46.5 | 45.7 | 45.1 | 45.2 | 46.4 | 46.0 |
| C | 41.2 | 43.7 | 43.1 | 40.7 | 41.3 | 41.4 | 41.3 | 41.1 | 41.2 |
| D | 45.0 | 47.0 | 47.4 | 41.0 | 43.8 | 46.8 | 46.1 | 43.7 | 45.9 |
| E | 43.5 | 46.1 | 45.7 | 44.5 | 44.0 | 43.5 | 43.4 | 44.7 | 44.6 |
| F | 44.9 | 45.2 | 45.2 | 44.4 | 45.2 | 45.4 | 45.0 | 44.4 | 44.5 |
| G | 42.1 | 48.2 | 48.0 | 46.4 | 46.2 | 46.0 | 45.6 | 46.6 | 46.0 |
| H | 47.6 | 51.7 | 52.9 | 52.6 | 51.6 | 50.9 | 51.0 | 51.2 | 50.8 |
| I | 40.2 | 42.0 | 40.7 | 38.7 | 40.2 | 40.2 | 39.7 | 39.3 | 39.0 |
| J | 43.2 | 43.4 | 42.4 | 40.4 | 41.9 | 42.1 | 41.5 | 41.0 | 40.7 |
| K | 51.7 | 55.8 | 55.7 | 52.8 | 53.1 | 53.3 | 52.3 | 53.9 | 52.6 |
| L | 43.6 | 46.8 | 47.0 | 43.7 | 44.7 | 45.1 | 45.2 | 44.7 | 45.4 |
| M | 37.0 | 41.5 | 40.9 | 40.7 | 37.7 | 37.3 | 36.8 | 39.6 | 39.3 |
| N | 46.0 | 47.0 | 47.1 | 44.0 | 44.5 | 44.7 | 44.9 | 44.8 | 45.4 |
| O | 47.9 | 50.7 | 51.4 | 49.2 | 48.1 | 48.4 | 48.2 | 48.7 | 48.7 |
| P | 43.4 | 45.2 | 45.4 | 44.2 | 45.2 | 45.8 | 45.0 | 44.3 | 44.5 |
| Q | 49.0 | 49.6 | 50.4 | 49.6 | 47.8 | 47.8 | 47.3 | 48.4 | 48.0 |
| R | 52.6 | 52.2 | 54.1 | 53.2 | 48.2 | 48.1 | 48.0 | 50.9 | 50.9 |
| S | 40.8 | 42.2 | 41.3 | 42.0 | 40.0 | 39.1 | 38.9 | 41.0 | 40.6 |
| T | 47.2 | 48.5 | 48.2 | 45.8 | 46.2 | 45.6 | 46.0 | 46.6 | 46.5 |
| RMSE | | 2.6 | 2.8 | 2.3 | 1.9 | 2.0 | 1.9 | 1.8 | 1.6 |

It is clearly seen that the root mean square error (RMSE) of the inventive method is significantly below that of any of the prior art methods for predicting the cetane number of diesel fuel with a cetane improver therein.

In a preferred embodiment of the present invention, there are at least 8 component properties which are collected from

TABLE IV

Cetane Specification Input Table for Diesel Fuel

| CETANE CALCULATIONS | Data Required: |
|---|---|
| Method 1 | Ethyl API, T50, T90, AnPt, Visc., Cloud |
| Method 2 | Ethyl API, T50, T90, Cloud, Arom |
| Method 3 | Ethyl API, T50, T10, T90, Cloud |
| Method 4 | Ethyl API, T50, AnPt, Visc. |
| Method 5 | Ethyl API, T50, T10, T90 |
| ASTM Method | D-976 API, T50 |

Depending on the data available, the appropriate method for calculating the required input ingredients is selected. Methods 1–5 are according to the present invention for calculating cetane requirements, the ASTM method D-976 is according to the prior art. It is notable that D-976 requires only two inputs, API gravity and T50.

If additional requirements are desired, they may be inputted via a similar spreadsheet table. Any other desired information, including processing information, costs, times, volumes, etc. may be included. An additionally preferred embodiment includes calculations for cold flow improver for diesel fuel once the variables have been calculated utilizing the multiple regression analysis of the instant invention.

Once the product characteristics have been inputted, a computing device (preferably a Pentium based PC running a form of Windows or equivalent software) then may calculate the required feedstock to manufacture the product. The calculations may be run in reverse, i.e. to determine what may be produced from the feedstock on hand.

Furthermore, the instant invention allows for the "tuning" of the equations for particular refineries, fuel sources, geographical variances, etc. with the collection of additional data and verification through actual samples. Each of the variables may be adjusted by one of skill in the art having regard for this disclosure by regressive analysis or similar means.

The efficient and profitable operation of a large scale manufacturing facility is illustrated as follows. A target cetane number for fuel is selected for a particular application, e.g. 45.

The fuel may be made a number of ways, by mixing various components, and/or by adding a cetane improver to the blend. Turning to Table V, which follows, the following pricing information is assumed to be known (not actual amounts):

Low Sulfur Diesel market price $23.10/bbl
Residual Fuel Oil market price $16.38/bbl
DII-3 market price $0.75/pound
Nominal refinery diesel output: 50,000 barrels per day (B/D)

The method according to the instant invention determines the precise amounts of components of the types of Virgin Distillate, Light Cycle Oil (LCO), and C&tane Improver to add to reach the desired property of 45 cetane number. However, profit optimization can help select the more economical production route, when ordinarily one such route might have been ignored. Case One is a traditional blend to result in the desired CN, and requires that a large amount of LCO be placed into the less profitable residual product. Whereas, in Case Two, the inclusion of DII-3™ cetane improver allows more LCO to be incorporated into the Diesel Pool, and less LCO into the less profitable Resid Pool. The sums saved are significant.

TABLE V

Product data:

| Diesel price: | $23.10/bbl |
|---|---|
| Resid price: | $16.38/bbl |
| Target CN: | 45 |

| Component | Bbl placed in Diesel pool | Diesel Rev, $ | Bbl placed in Resid pool | Resid Rev, $ | Total Rev, $ |
|---|---|---|---|---|---|
| Case One, low usage rate of inexpensive component LCO | | | | | |
| Virgin distillate | 35,000 | 808,500 | 0 | 0 | 808,500 |
| LCO | 5,000 | 115,500 | 10,000 | 163,800 | 279,300 |
| Total Rev: | | | | | 1,087,800 |
| Case Two, high usage rate of inexpensive component LCO | | | | | |
| Virgin distillate | 34,950 | 807,345 | 0 | 0 | 807,345 |
| LCO | 9,950 | 229,845 | 5,000 | 81,900 | 311,745 |
| DII-3 | 100 | −25,295 | | | −25,295 |
| Total Rev: | | | | | 1,093,796 |

Results (comparing Case Two to Case One):

| Savings per bbl: | $0.12 |
|---|---|
| Savings per day: | $5,996 |
| Savings per yr: | $2,188,358 |

The entire disclosure of all applications, patents, available software, ASTM and other standards, and publications cited above and throughout this application are hereby incorporated by reference.

The preceding examples can be repeated with similar success by substituting the generically or specifically described compositions, reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

While the invention has been described in connection with the preferred embodiment, it should be understood readily that the present invention is not limited to the disclosed embodiment. Rather, the present invention is intended to cover various equivalent arrangements and is only limited by the claims which follow.

Having described the invention as above, we claim:

1. A method of accurately predicting a characteristic of a product to be prepared by a processing plant, comprising
   identifying an incoming material, said material having at least one measured property,
   selecting at least one product to be prepared from said incoming material by said processing plant, said product having at least one desired characteristic,
   selecting a process to be used by the processing plant to produce the product, said process having an effect upon the characteristic of the product,
   calculating a predicted value of the characteristic of the product utilizing a predictive equation, wherein the predictive equation is generated by regressive analysis of an accumulation of data relating the measured property of the incoming material, the process, and the characteristic of the product;
   wherein the incoming material is a petroleum feedstock, the product is diesel fuel, the process is admixing cetane improver, and the characteristic of the product is cetane number, and wherein the measured property includes at least API gravity, T50 and at least two additional properties selected from the group consisting of T10, T90, aniline point, viscosity, cloud point, and aromatics content.

2. A method as claimed in claim 1, wherein the measured property is selected from the group consisting of hydrocarbon type, carbon content, hydrogen content, sulfur content, nitrogen content, API gravity, distillation range, cetane number, aniline point, heat content, kinematic viscosity, cloud point, pour point, and flash point.

3. A method as claimed in claim 1, wherein the at least two additional properties are T90, aniline point, viscosity, and cloud point.

4. A method as claimed in claim 1, wherein the at least two additional properties are T90, cloud point, and aromatics content.

5. A method as claimed in claim 1, wherein the at least two additional properties are T10, T90, and cloud point.

6. A method as claimed in claim 1, wherein the at least two additional properties are viscosity, and aniline point.

7. A method as claimed in claim 1, wherein the at least two additional properties are T10 and T90.

8. A method as claimed in claim 3, wherein the predictive equation is a set of non-linear equations comprising:

$$CN0=-0.07307\times T10+0.3080\times ANPT-1.152\times VISC40+0.4957\times D976+0.1836\times CLOUD+31.57$$

$$CN1000=-0.09374\times T10+0.2738\times ANPT-0.9512\times VISC40+0.5890\times D976+0.2069\times CLOUD+40.16$$

$$CN2500=-0.09681\times T10+0.2521\times ANPT-0.9890\times VISC40+0.6700\times D976+0.1943\times CLOUD+42.38$$

$$CN5000=-0.09009\times T10+0.3084\times ANPT-1.183\times VISC40+0.6461\times D976+0.1695\times CLOUD+41.30$$

$$CN7500=-0.07602\times T10+0.3624\times ANPT-1.307\times VISC40+0.6495\times D976+0.1371\times CLOUD+35.77$$

$$CN10000=-0.06971\times T10+0.4190\times ANPT-1.257\times VISC40+0.6033\times D976+0.1086\times CLOUD+33.75$$

wherein
CN is cetane number of the product at the noted concentration of cetane improver of from 0 to 10,000 ppmv, and intermediate values are interpolated between points, T10 is the temperature at which 10% of the product boils off, ANPT is the aniline point of the product, VISC40 is the viscosity of the product at 40° C. according to ASTM D445, D976 is the cetane index of the product according to ASTM D976, and CLOUD is the cloud point of the product.

9. A method as claimed in claim 4, wherein the predictive equation is a set of non-linear equations comprising:

$$CN0=0.1700\times T50-0.09022\times T90-238.4\times SPGR-0.1199\times FIAAROM+0.2187\times CLOUD+237.8$$

$$CN1000=0.1802\times T50-0.1062\times T90-256.1\times SPGR-0.1123\times FIAAROM+0.2419\times CLOUD+259.8$$

$$CN2500=0.1861\times T50-0.1073\times T90-264.7\times SPGR-0.1213\times FIAAROM+0.2310\times CLOUD+269.9$$

$$CN5000=0.1928\times T50-0.1037\times T90-267.9\times SPGR-0.1489\times FIAAROM+0.2113\times CLOUD+273.4$$

$$CN7500=0.2079\times T50-0.09233\times T90-283.8\times SPGR-0.1700\times FIAAROM+0.1829\times CLOUD+282.1$$

$$CN10000=0.2163\times T50-0.08637\times T90-285.5\times SPGR-0.1931\times FIAAROM+0.1574\times CLOUD+281.7$$

wherein
CN is cetane number of the product at the noted concentration of cetane improver of from 0 to 10,000 ppmv, and intermediate values are interpolated between points, T50 is the temperature at which 50% of the product boils off, T90 is the temperature at which 90% of the product boils off, SPGR is the specific (API) gravity of the product, FIAAROM is the aromatics content of the product according to ASTM D 1319, and CLOUD is the cloud point of the product.

10. A method as claimed in claim 5, wherein the predictive equation is a set of non-linear equations comprising:

$$CN0=0.05286\times T10+0.1329\times T50-0.07308\times T90-319.2\times SPGR+0.1984\times CLOUD+295.1$$

$$CN1000=0.05529\times T10+0.1391\times T50-0.08732\times T90-332.5\times SPGR+0.2220\times CLOUD+313.6$$

$$CN2500=0.06523\times T10+0.1357\times T50-0.08412\times T90-348.0\times SPGR+0.2085\times CLOUD+328.0$$

$$CN5000=0.09178\times T10+0.1182\times T50-0.06947\times T90-371.4\times SPGR+0.1817\times CLOUD+344.9$$

$$CN7500=0.1203\times T10+0.1059\times T50-0.04557\times T90-403.8\times SPGR+0.1464\times CLOUD+363.9$$

$$CN1000=0.1377\times T10+0.09925\times T50-0.03274\times T90-422.0\times SPGR+0.1158\times CLOUD+374.5$$

wherein
CN is cetane number of the product at the noted concentration of cetane improver of from 0 to 10,000 ppmv, and intermediate values are interpolated between points, T10 is the temperature at which 10% of the product boils off, T50 is the temperature at which 50% of the product boils off, T90 is the temperature at which 90% of the product boils off, SPGR is the specific gravity of the product, and CLOUD is the cloud point of the product.

11. A method as claimed in claim 6, wherein the predictive equation is a set of non-linear equations comprising:

$$CN0=0.2811\times ANPT-1.030\times VISC40+0.6519\times D976$$

$$CN1000=0.2403\times ANPT-0.9091\times VISC40+0.7946\times D976$$

$$CN2500=0.2171\times ANPT-1.075\times VISC40+0.9147\times D976$$

$$CN5000=0.2632\times ANPT-1.335\times VISC40+0.9365\times D976$$

$$CN7500=0.3048\times ANPT-1.322\times VISC40+0.9346\times D976$$

$$CN10000=0.3534\times ANPT-1.259\times VISC40+0.9055\times D976$$

wherein

CN is cetane number of the product at the noted concentration of cetane improver of from 0 to 10,000 ppmv, and intermediate values are interpolated between points, ANPT is the aniline point of the product, VISC40 is the viscosity of the product at 40° C. according to ASTM D445, and D976 is the cetane index of the product according to ASTM D976.

12. A method as claimed in claim 7, wherein the predictive equation is a set of non-linear equations comprising:

$$CN0=-0.5659 \times T10+0.000458 \times T50 \times T90-0.000992 \times (T90)^2+0.5261 \times T10/SPGR+0.4263 \times T90/SPGR-64.40$$

$$CN1000=-0.4433 \times T10+0.000483 \times T50 \times T90-0.001215 \times (T90)^2+0.4254 \times T10/SPGR+0.5364 \times T90/SPGR-81.53$$

$$CN2500=-0.4733 \times T10+0.000468 \times T50 \times T90-0.001226 \times (T90)^2+0.4588 \times T10/SPGR+0.5420 \times T90/SPGR-79.54$$

$$CN5000=-0.5823 \times T10+0.000399 \times T50 \times T90-0.001130 \times (T90)^2+0.5736 \times T10/SPGR+0.5086 \times T90/SPGR-73.52$$

$$CN7500=-0.6247 \times T10+0.000359 \times T50 \times T90-0.001125 \times (T90)^2+0.6320 \times T10/SPGR+0.5245 \times T90/SPGR-79.91$$

$$CN10000=-0.7223 \times T10+0.000346 \times T50 \times T90-0.001046 \times (T90)^2+0.7272 \times T10/SPGR+0.4876 \times T90/SPGR-74.34$$

wherein:

CN is cetane number of the product at the noted concentration of cetane improver of from 0 to 10,000 ppmv, and intermediate values are interpolated between points, T10 is the temperature at which 10% of the product boils off, T50 is the temperature at which 50% of the product boils off, T90 is the temperature at which 90% of the product boils off, and SPGR is the specific gravity of the product.

13. A method as claimed in claim 1, wherein the product is diesel fuel, and at least one characteristic of the product is pour point.

14. A method as claimed in claim 1, wherein the calculating is performed on a computing device with appropriate software.

15. A method as claimed in claim 1, wherein the cost of the incoming material and the market price of the product are known, and the step of calculating includes optimizing the profitability of the process.

16. A process for the optimization of diesel fuel production, comprising providing a database of diesel fuel stocks, additives, and products having a set of known properties, providing a non-linear formula for the prediction of diesel fuel properties based upon a regressive analysis of the known properties collected from a series of samples, providing a computing device connected to said at least one database, providing computing instructions incorporating said formula for the prediction of diesel fuel properties, and calculating the diesel fuel properties utilizing said computing device, wherein the set of known properties includes at least API gravity, T50 and at least two additional properties selected from the group consisting of T10, T90, aniline point, viscosity, cloud point, and aromatics content, wherein the computing instructions provide for admixing cetane improver, and wherein the prediction of diesel fuel properties includes cetane number.

17. A process as claimed in claim 16, wherein the computing device is a computer and the instructions comprise computer software.

18. A process as claimed in claim 16, wherein the database is a spreadsheet of the set of known properties.

19. A process as claimed in claim 16, wherein the database includes the price of the diesel fuel stocks, additives, and products and the cost of processing, and the software includes an optimizer, whereby the maximum profitability of the process may be calculated.

20. A method as claimed in claim 1 wherein the predictive equation is a non-linear equation comprising:

$$CN(X)=T10 \times (-0.06971 \text{ to } -0.09681)+ANPT \times (0.2521 \text{ to } 0.4190)+ VISC40 \times (-0.9512 \text{ to } -1.307)+D976 \times (0.4957 \text{ to } 0.6700)+ CLOUD \times (0.1086 \text{ to } 0.2069)+(31.57 \text{ to } 42.38),$$

where (X) equals ppmv of cetane improver ranging from 0 to 10,000 ppmv,

CN is cetane number of the product at a concentration of cetane improver ranging from 0 to 10,000 ppmv, T10 is the temperature at which 10% of the product boils off, ANPT is the aniline point of the product, VISC40 is the viscosity of the product at 40° C. according to ASTM D445, D976 is the cetane index of the product according to ASTM D976, and CLOUD is the cloud point of the product.

21. A method as claimed in claim 1 wherein the predictive equation is a non-linear equation comprising:

$$CN(X)=T50 \times (0.1700 \text{ to } 0.2163)+T90 \times (-0.08637 \text{ to } -0.1073)+ SPGR \times (-238.4 \text{ to } -285.5)+FIAAROM \times (-0.1123 \text{ to } -01931)+ CLOUD \times (0.1574 \text{ TO } 0.2419)+(237.8 \text{ TO } 282.1),$$

where (x) equals ppmv of cetane improver ranging from 0 TO 10,000 ppmv,

CN is cetane number of the product at the concentration of cetane improver of from 0 to 10,000 ppmv, T50 is the temperature at which 50% of the product boils off, T90 is the temperature at which 90% of the product boils off, SPGR is the specific (API) gravity of the product, FIAAROM is the aromatics content of the product according to ASTM D1319, and CLOUD is the cloud point of the product.

22. A method as claimed in claim 1 wherein the predictive equation is a non-linear equation comprising:

$$CN(X)=T10 \times (0.05286 \text{ to } 0.1377)+T50 \times (0.09925 \text{ to } 0.1391)+ T90(-0.03274 \text{ to } -0.08732)+SPGR \times (-319.2 \text{ to } -422.0)+ CLOUD \times (0.1158 \text{ TO } 0.2220)+(295.1 \text{ to } 374.5),$$

where (X) equals ppmv of cetane improver ranging from 0 to 10,000 ppmv,

CN is cetane number of the product at the concentration of cetane improver of from 0 to 10,000 ppmv, T10 is the temperature at which 10% of the product boils off, T50 is the temperature at which 50% of the product boils off, T90 is the temperature at which 90% of the product boils off, SPGR is the specific gravity of the product, and CLOUD is the cloud point of the product.

23. A method as claimed in claim 1 wherein the predictive equation is a non-linear equation comprising:

$$CN(X)=ANPT\times(0.2171 \text{ to } 0.3534)+VISC40(-0.9091 \text{ to } -1.335)+D976\times(0.6519 \text{ to } 0.9365),$$

where (X) equals ppmv of cetane improver ranging from 0 to 10,000 ppmv,

CN is cetane number of the product at the noted concentration of cetane improver of from 0 to 10,000 ppmv, ANPT is the aniline point of the product, VISC40 is the viscosity of the product at 40° C. according to ASTM D445, and D976 is the cetane index of the product according to ASTM D976.

24. A method as claimed in claim 1 wherein the predictive equation is a non-linear equation comprising:

$$CN(X)=T10\times(-0.4433 \text{ to } -0.7223)+T50\times T90\times(0.000346 \text{ to } 0.000483)+(T90)^2\times(-0.000992 \text{ to } -0.001226)+T10/SPGR\times(0.4254 \text{ to } 0.7272)+T90/SPGR\times(0.4263 \text{ to } 0.5420)+(-64.40 \text{ to } -81.53),$$

where (X) equals ppmv of cetane improver ranging from 0 to 10,000 ppmv,

CN is cetane number of the product at the noted concentration of cetane improver of from 0 to 10,000 ppmv, T10 is the temperature at which 10% of the product boils off, T50 is the temperature at which 50% of the product boils off, T90 is the temperature at which 90% of the product boils off, and SPGR is the specific gravity of the product.

* * * * *